(12) United States Patent
Wang

(10) Patent No.: US 12,210,690 B1
(45) Date of Patent: Jan. 28, 2025

(54) OPTICAL NAVIGATION DEVICE AND METHOD CAPABLE OF MORE EFFICIENTLY SAVING POWER

(71) Applicant: PixArt Imaging Inc., Hsin-Chu (TW)

(72) Inventor: Tsung-Fa Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/368,023

(22) Filed: Sep. 14, 2023

(51) Int. Cl.
*G06F 3/03* (2006.01)
*G06F 3/0354* (2013.01)
*G06F 3/038* (2013.01)

(52) U.S. Cl.
CPC ........ *G06F 3/0317* (2013.01); *G06F 3/03543* (2013.01); *G06F 3/0383* (2013.01); *G06F 3/0304* (2013.01)

(58) Field of Classification Search
None
See application file for complete search history.

(56) References Cited

U.S. PATENT DOCUMENTS

| | | | | |
|---|---|---|---|---|
| 7,161,585 B2 * | 1/2007 | Lauffenburger | ...... | G06F 3/0383 250/553 |
| 7,532,200 B2 * | 5/2009 | Chu | ..................... | G06F 3/03543 345/157 |
| 8,213,865 B2 * | 7/2012 | Jensen | .............. | H04W 52/0254 345/157 |
| 2004/0113890 A1 * | 6/2004 | Ranta | ...................... | G06F 3/038 713/300 |
| 2005/0001817 A1 * | 1/2005 | Lauffenburger | ...... | G06F 3/0383 345/166 |
| 2006/0114231 A1 * | 6/2006 | Koh | ...................... | G06F 1/3259 345/166 |
| 2006/0146022 A1 * | 7/2006 | Lin | ........................ | G06F 3/038 345/163 |
| 2009/0160774 A1 * | 6/2009 | Lee | ...................... | G06F 3/03543 345/166 |
| 2009/0237358 A1 * | 9/2009 | Chang | ..................... | G06F 3/038 345/163 |
| 2013/0229514 A1 * | 9/2013 | Huang | ................... | G01C 11/02 348/140 |
| 2014/0327619 A1 * | 11/2014 | Chang | .................. | G06F 3/0383 345/163 |
| 2015/0301630 A1 * | 10/2015 | Lee | ....................... | G06F 3/0383 345/163 |
| 2015/0355733 A1 * | 12/2015 | Chang | ................. | G06F 3/03543 345/163 |
| 2016/0054816 A1 * | 2/2016 | Lee | ........................ | G01B 11/14 345/166 |
| 2019/0033992 A1 * | 1/2019 | Morier | ................... | G06F 3/0304 |
| 2021/0271334 A1 * | 9/2021 | Lye | ......................... | H03K 21/08 |
| 2021/0373678 A1 * | 12/2021 | Chauvin | ............... | G06F 3/0383 |
| 2023/0400938 A1 * | 12/2023 | Goh | ..................... | G06F 3/03543 |
| 2023/0419511 A1 * | 12/2023 | Lojewski | ................ | G06T 7/248 |

* cited by examiner

*Primary Examiner* — Dorothy Harris
(74) *Attorney, Agent, or Firm* — Winston Hsu

(57) ABSTRACT

A method of an optical navigation device, to be coupled to a computer device through a specific communication interface, includes: providing an optical sensor to sense and generate an optical navigation position related signal in response to a movement of the optical navigation device; detecting a moving speed of the movement of the optical navigation device; and, dynamically adjusting a transmission report rate of the optical navigation device, which is used to periodically transmit the optical navigation position related signal to the computer device, based on the detect moving speed.

15 Claims, 5 Drawing Sheets

OPTICAL NAVIGATION DEVICE AND METHOD CAPABLE OF MORE EFFICIENTLY SAVING POWER

BACKGROUND OF THE INVENTION

1. Field of the Invention

The invention relates to an optical navigation device, and more particularly to an optical navigation device and corresponding method capable of more efficiently saving power.

2. Description of the Prior Art

Generally speaking, in order to achieve a better performance such as instant position report and/or instant button output, a radio-frequency transmission report rate of a conventional wireless gamming mouse device is kept at a higher report rate such as four-thousand position related signals/samples per second, and inevitably the power consumption amount of the conventional wireless gamming mouse device will significantly increase.

SUMMARY OF THE INVENTION

Therefore one of the objectives of the invention is to provide an optical navigation device and corresponding method to solve the above-mentioned problems.

According to embodiments of the invention, an optical navigation device to be coupled to a computer device through a specific communication interface is disclosed. The optical navigation device comprises an optical sensor, a transmission controller, and a microcontroller. The optical sensor is configured to sense and generate an optical navigation position related signal in response to a movement of the optical navigation device. The transmission controller is configured to wirelessly couple to the computer device. The microcontroller is coupled between the optical sensor and the transmission controller, and is configured to detect a moving speed of the movement of the optical navigation device and to control the transmission controller dynamically adjusting a transmission report rate of the transmission controller, which is used to periodically transmit the optical navigation position related signal to the computer device through the transmission controller with the transmission report rate, based on the detect moving speed.

According to the embodiments, an optical navigation device to be coupled to a computer device through a specific communication interface is disclosed. The optical navigation device comprises an optical sensor and a microcontroller. The optical sensor is configured to sense and generate an optical navigation position related signal in response to a movement of the optical navigation device. The microcontroller is coupled to the optical sensor, and is configured to detect a moving speed of the movement of the optical navigation device and to dynamically adjust a transmission report rate, which is used to periodically and wirelessly transmit the optical navigation position related signal to the computer device with the transmission report rate, based on the detect moving speed.

According to the embodiments, a method of an optical navigation device to be coupled to a computer device through a specific communication interface is disclosed. The method comprises: providing an optical sensor to sense and generate an optical navigation position related signal in response to a movement of the optical navigation device; detecting a moving speed of the movement of the optical navigation device; and, dynamically adjusting a transmission report rate of the optical navigation device, which is used to periodically transmit the optical navigation position related signal to the computer device, based on the detect moving speed.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an optical navigation device capable of more efficiently saving power based on a smart power saving algorithm (or a hardware circuit). Particularly, the provided optical navigation device can be arranged to detect a moving speed of the optical navigation device (or a moving speed of a device in which the optical navigation device is installed) to dynamically adjust the power consumption of the optical navigation device in response to the different values of the detected moving speed. In one embodiment, the optical navigation device may be a gamming mouse device (but not limited). Alternatively, the optical navigation device may be installed on a movable device such as a car vehicle, a railcar vehicle, a car model tory, a railcar model tory, a movable toy device, a printer device, or any type movable device (or electronic device); this is not intended to be a limitation.

Figure 1:
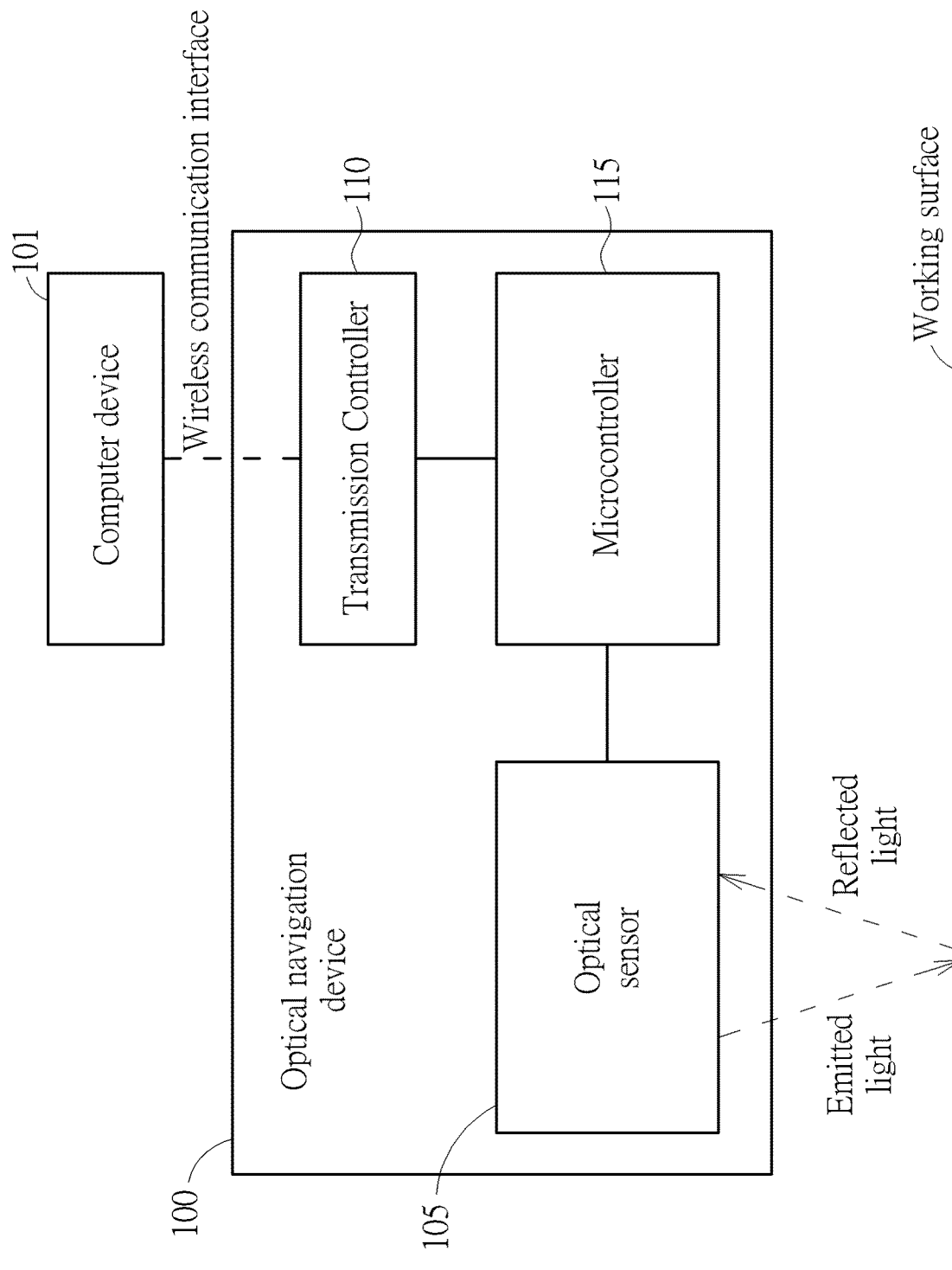
FIG. 1 is a block diagram of an optical navigation device according to an embodiment of the invention.

FIG. 1 is a block diagram of an optical navigation device 100 according to an embodiment of the invention. The optical navigation device 100 is used to be coupled to a computer device 101 (e.g. a personal computer (PC)) through a specific communication interface such as a wireless communication interface, and in one embodiment it comprises an optical sensor 105, a transmission controller 110 such as a radio-frequency (RF) transmitter, and a microcontroller 115 such as a processing circuit/unit.

The optical sensor 105 is configured to sense and generate an optical navigation position related signal in response to a movement of the optical navigation device 100 by emitting light rays into a working surface and receiving the reflected light rays from the working surface to obtain texture pattern images. For example, in one embodiment, the optical navigation device is an optical mouse device, and the optical sensor may be arranged to sense the reflected light from a working surface onto which the optical mouse device is placed so as to generate sensing frames; when the optical mouse device is moved, the optical sensor 105 can generate a corresponding optical navigation position related signal in response to the movement of the optical mouse device, wherein the corresponding optical navigation position related signal indicates a corresponding position shift of a cursor within a display screen picture displayed by the computer device 101.

In one embodiment, an optical navigation position related signal for example may indicate position shift information, i.e. the delta value (position shift) from a position point to another position point. In another embodiment, an optical navigation position related signal for example may indicate position point information such as absolute values of position points on a specific working surface. These modifications all obey the spirits of the invention. The optical navigation device 100 can transmit the position shift information and/or the position point information into the computer device 101 to move the cursor within the display screen.

In one embodiment, the optical navigation device 100 may be installed into a movable device such as a car device or a car model toy device, and the optical sensor 105 may receive and sense the reflected light from a working surface of a path (e.g. a railway path, road, street, avenue, or highway) on which the movable device is placed so as to generate sensing frames. Similarly, in this situation, the optical navigation device 100 can also generate a corresponding optical navigation position related signal in response to the movement of the optical navigation device 100 (or the movement of the movable device).

The optical sensor 105 may use a specific sample rate to generate optical navigation position related signals into the microcontroller 115, and the specific sample rate may be substantially identical to or higher than a transmission report rate (i.e. a polling rate) of the transmission controller 110 wherein the transmission report rate can be dynamically adjusted by the microcontroller 115.

The transmission controller 110 is configured to be wirelessly coupled to the computer device 101. For example, the transmission controller 110 is arranged to report and transmit a current/latest optical navigation position related signal into the computer device 101 wirelessly based on the transmission report rate. For example, when the dynamically adjusted transmission report rate is lower than the specific sample rate, there is a great possibility that more than one position related signals, sequentially outputted from the optical sensor 105, may be buffered in the microcontroller 115, and the transmission controller 110 is arranged to report and transmit the latest position related signal to the computer device 101 wirelessly if it is needed to report a position related signal based on the transmission report rate.

The microcontroller 115 is coupled between the optical sensor 105 and the transmission controller 110, and it is configured to detect a moving speed of the movement of the optical navigation device 100 based on the received optical navigation position related signals and to control the transmission controller dynamically adjusting the transmission report rate of the transmission controller 110, which is used to periodically transmit the optical navigation position related signals to the computer device 101 through the transmission controller 110 with the adjusted transmission report rate, based on the detect moving speed.

For example, in the embodiments, equivalently the transmission report rate is adjusted to be inversely proportional to the moving speed of the optical navigation device 100. When the optical navigation device 100 moves slowly, the transmission report rate is adjusted to become higher so that the optical navigation device 100 generates and transmits more optical navigation position related signals into the computer device 101 during an identical report period and thus the optical navigation device 100 can more accurately report its position information to the computer device 101. When the optical navigation device 100 moves fast, f the transmission report rate is adjusted to be lower so that the optical navigation device 100 (or the transmission controller 110) transmits fewer optical navigation position related signals into the computer device 101 during the identical report period and thus the power consumption of the transmission controller 110 can be reduced.

Figure 2:
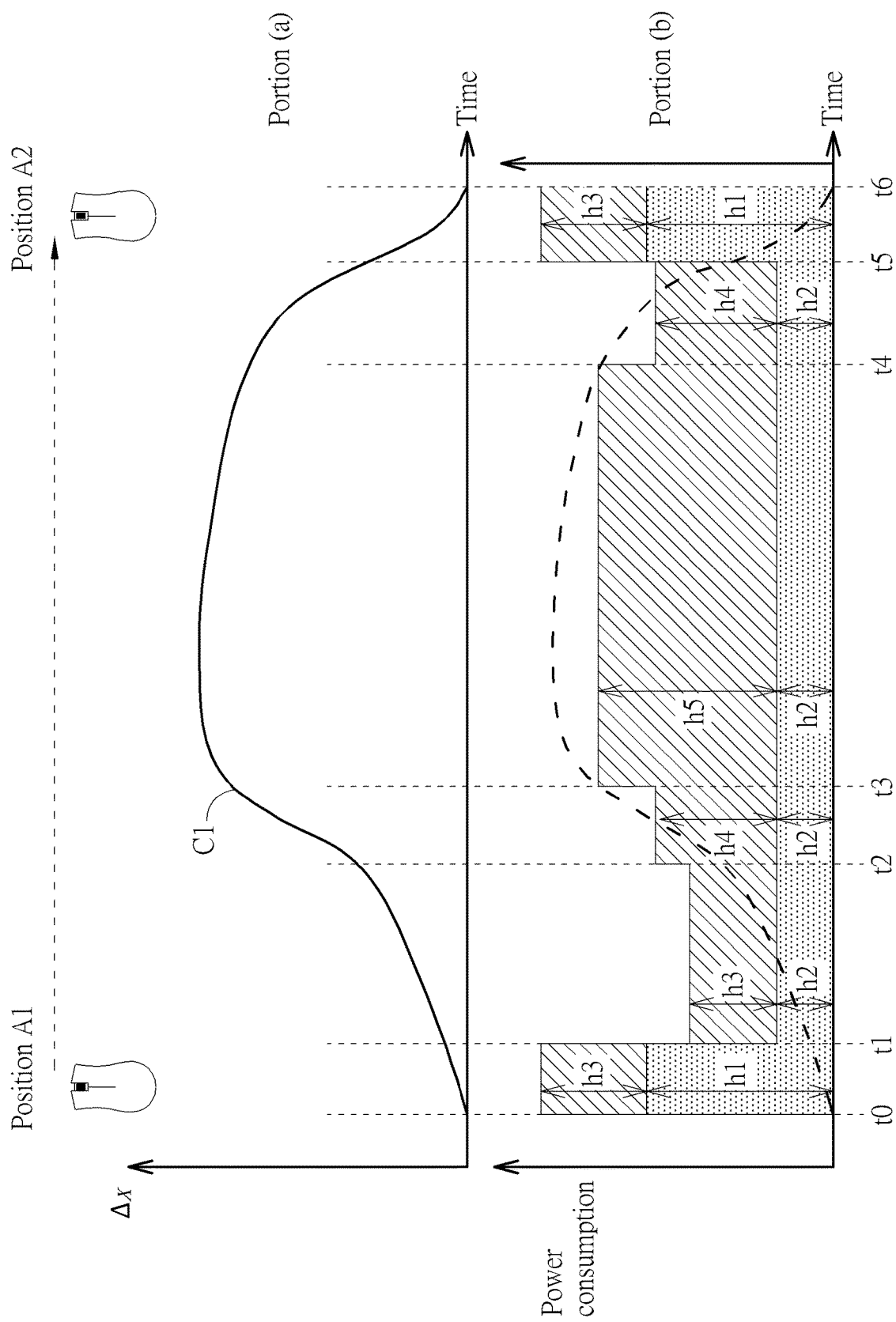
FIG. 2 is a diagram showing an example that the optical navigation device being used as an optical mouse device is moved according to an embodiment of the invention.

FIG. 2 is a diagram showing an example that the optical navigation device 100 being used as an optical mouse device is moved according to an embodiment of the invention. In the portion (a) of FIG. 2, the vertical axis (Y-axis) shows the different difference values Δx between two adjacent/consecutive position related signals reported by the transmission controller 110 while the horizontal axis (X-axis) shows the time values. A greater difference value of two position related signals indicates a longer moving distance of the optical navigation device 100, and a smaller difference value of two position related signals indicates a shorter moving distance of the optical navigation device 100. The optical navigation device 100 for example is moved by a user from a position A1 of the working surface to another position A2 of the working surface. The curve C1 as shown in FIG. 2 shows that the optical navigation device 100 may move with different moving speed ranges during different time intervals. A value of the curve C1 at a specific time point indicates a current value of the moving speed of the optical navigation device 100, and the slope value of the curve C1 indicates a change of the moving speed of the optical navigation device 100.

For example (but not limited), a user's control behavior may slowly increase the moving speed of the optical navigation device 100 at first, then rapidly increase the moving speed, then slightly decrease the moving speed if the moving speed at a high moving speed range, and finally may rapidly decrease the moving speed if the optical navigation device 100 has been moved and close to the destination position. During a first interval from time t0 to time t1, the optical navigation device 100 for instance may begin from the start position A1 and move with a low moving speed since the moving speed is initially and slowly increased by the control of the user. In this situation, when the moving speed is lower than a specific threshold, the microcontroller 115 may determine that it is needed to more accurately locate the position of the optical navigation device 100 and also to more accurately transmit and report the position information of the optical navigation device 100 into the computer device 101, and thus the microcontroller 115 controls the transmission controller 110 using a higher transmission report rate to report more position related signals into the computer device 101. The height h1 of the dot area from time t0 to time t1 indicates a power consumption consumed by the transmission controller 110 operating with the higher transmission report rate.

Then, during a second interval from time t1 to time t2, the moving speed of the optical navigation device 100 for instance may be still slowly increased by the control of the user, and the moving speed during the second interval from time t1 to time t2 is higher than that during the first interval from time t0 to time t1. In this example, when the moving speed is higher than the specific threshold, the microcontroller 115 may determine that the importance of saving more power is higher than that of reporting more position related signals into the computer device 101, and thus the microcontroller 115 controls the transmission controller 110 using a lower transmission report rate to report fewer position related signals into the computer device 101. The height h2 of the dot area from time t1 to time t2 indicates a smaller power consumption amount consumed by the transmission controller 110 operating with the lower transmission report rate.

During a third interval from time t2 to time t3, the moving speed of the optical navigation device 100 for instance may be rapidly increased by the control of the user. Then, during a fourth interval from time t3 to time t4, the moving speed of the optical navigation device 100 for instance may approach a top moving speed and then is slightly and slowly decreased by the control of the user. Then, during a fifth interval from time t4 to time t5, the moving speed of the optical navigation device 100 for instance may be rapidly decreased by the control of the user. From time t2 to time t5, the varied moving speed is still higher than the specific threshold, and the microcontroller 115 controls the transmission controller 110 using the lower transmission report rate to report fewer position related signals into the computer device 101. The height h2 of the dot area indicates the smaller power consumption amount consumed by the transmission controller 110 operating with the lower transmission report rate.

Then, during a sixth interval from time t5 to time t6, the decreased moving speed of the optical navigation device 100 for instance becomes lower than the specific threshold and finally the optical navigation device 100 is at the position A2. In this situation, the microcontroller 115 may determine again that it is needed to more accurately locate the position of the optical navigation device 100 and also to more accurately transmit and report the position information of the optical navigation device 100 into the computer device 101, and thus the microcontroller 115 controls the transmission controller 110 using the higher transmission report rate to report more position related signals into the computer device 101. The height h1 of the dot area from time t5 to time t6 indicates the greater power consumption consumed by the transmission controller 110 operating with the higher transmission report rate. By doing so, the optical navigation device 100 is capable of instantly transmitting and reporting more position related signals if it is needed as well as saving more power when it is not needed to instant report a position related signal.

In the embodiment, the transmission report rate of the transmission controller 110 equivalently and dynamically switches between a higher transmission report rate and a lower transmission report rate. In other embodiments, based on the control of the microcontroller 115, the transmission controller 110 may select and use one among more than two different transmission report rates. This also falls within the scope of the invention.

Further, in the embodiment of FIG. 2, the frame rate of optical sensor 105, i.e. the number of frames sensed and generated by the optical sensor 105 per second, may be dynamically adjusted in response to the different values of the moving speed of the optical navigation device 100. For example (but not limited), when the moving speed of optical navigation device 100 is slowly increased from time t0 to time t2, the microcontroller 115 controls the optical sensor 105 using a low frame rate to sense and generate frames/images. The height h3 of the slash area from time t0 to time t2 indicates a small power consumption consumed by the optical sensor 105 operating with the low frame rate. The value of height h3 is between those of h1 and h2; however, this is intended to be a limitation of the invention.

When the moving speed of optical navigation device 100 is rapidly increased from time t2 to time t3 and rapidly decreased from time t4 to time t5, the microcontroller 115 controls the optical sensor 105 using a middle frame rate to sense and generate frames/images. The height h4 of the slash area indicates a middle power consumption consumed by the optical sensor 105 operating with the middle frame rate. The value of height h4 is higher than the values of h2 and h3, and it is lower that the value of height h1; however, this is intended to be a limitation of the invention.

When the moving speed of optical navigation device 100 is at a top moving speed range from time t3 to time t4, the microcontroller 115 controls the optical sensor 105 using a high/top frame rate to sense and generate frames/images. The height h5 of the slash area indicates a high power consumption consumed by the optical sensor 105 operating with the high frame rate. The value of height h5 is higher than the values of heights h2, h3, and h4; however, this is intended to be a limitation of the invention. The height h5 may be higher than the height h1 or may be lower than the height h1, and it depends upon a hardware circuit design of the user.

Equivalently, in the embodiment, when the transmission report rate of the transmission controller 110 is adjusted down, the frame rate of the optical sensor 105 may be adjusted up; when the transmission report rate of the transmission controller 110 is adjusted up, the frame rate of the optical sensor 105 may be adjusted down. However, this is not meant to be a limitation. In another embodiment, the frame rate of the optical sensor 105 may be kept and is not varied in response to the moving speed of the optical navigation device 100.

Figure 3:
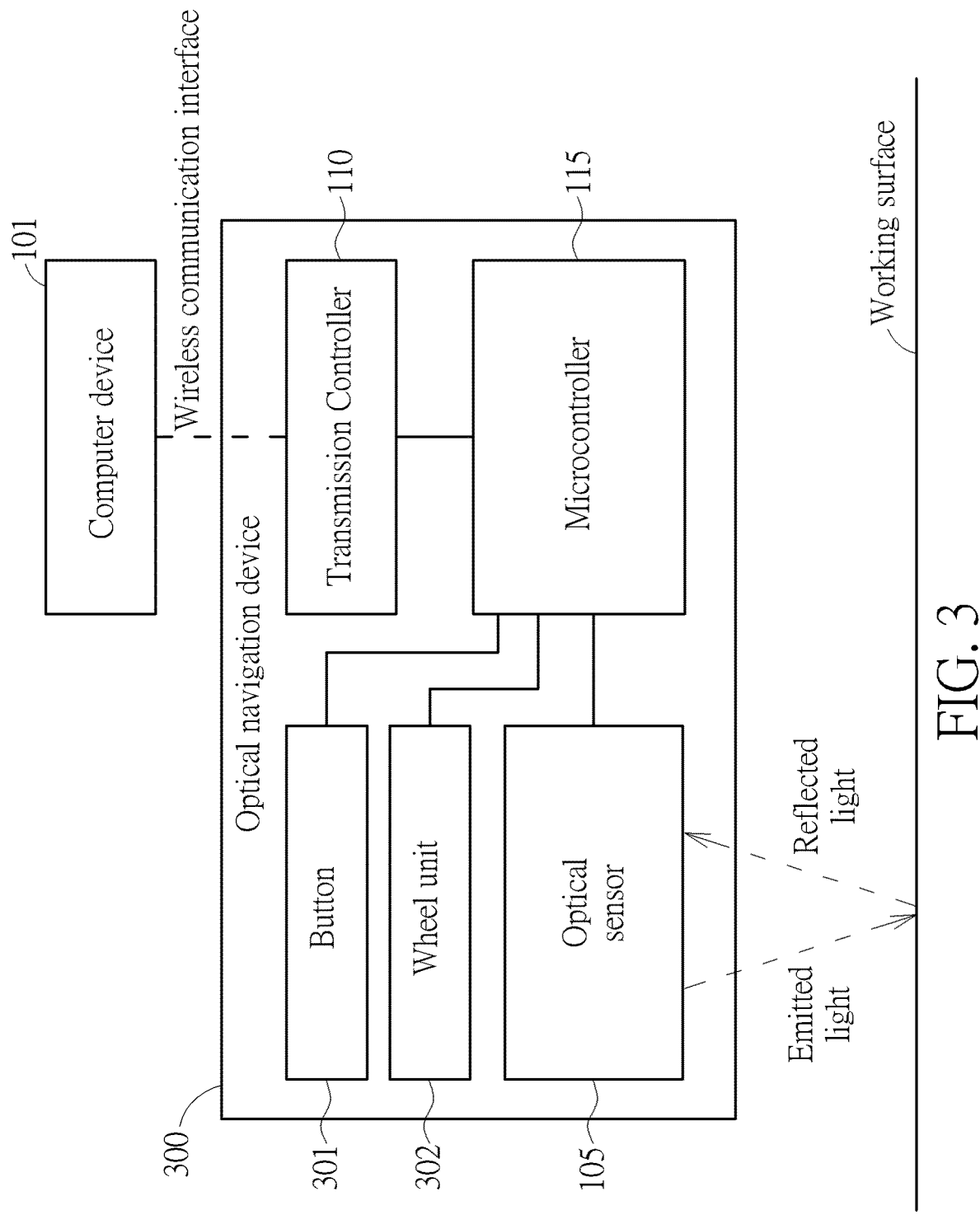
FIG. 3 is a block diagram of an optical navigation device being used as an optical mouse device such as a gamming mouse device according to an embodiment of the invention.

Further, in one embodiment, when the optical navigation device for example is an optical mouse device (e.g. a gamming mouse device, but not limited) which may further comprise at least one controllable user input unit such as at least one clickable button and also comprise a controllable wheel unit. Refer to FIG. 3 in conjunction with FIG. 4. FIG. 3 is a block diagram of an optical navigation device 300 being used as an optical mouse device such as a gamming mouse device according to an embodiment of the invention. Compared to the device 100, the optical navigation device 300 further comprises at least one clickable button 301 and a controllable wheel unit 302. When the user uses and operates the clickable button 301 and/or the controllable wheel unit 302 of the optical mouse device 300, the microcontroller 115 controls the transmission controller 110 using a specific report rate, which is higher than the currently used transmission report rate for the optical navigation position related signal, to transmit user control input information of the clickable button 301 and/or the controllable wheel unit 302 to the computer device 101.

For example, in a condition that the optical mouse device 300 moves fast, the microcontroller 115 may control the transmission controller 110 using the basic transmission report rate as its transmission report rate. In this situation, if the user uses and operates the clickable button 301 and/or the controllable wheel unit 302 of the optical mouse device 300, then the microcontroller 115 can instantly control the transmission controller 110 using a specific report rate, which is higher than the transmission report rate (i.e. the basic report rate in this condition) for the optical navigation position related signal. For example, in this situation, the microcontroller 115 can immediately increase and control the transmission report rate at the four-thousand position related signals per second in response to an event that the user uses and operates the clickable button 301 and/or the controllable wheel unit 302 of the optical mouse device 300.

Figure 4:
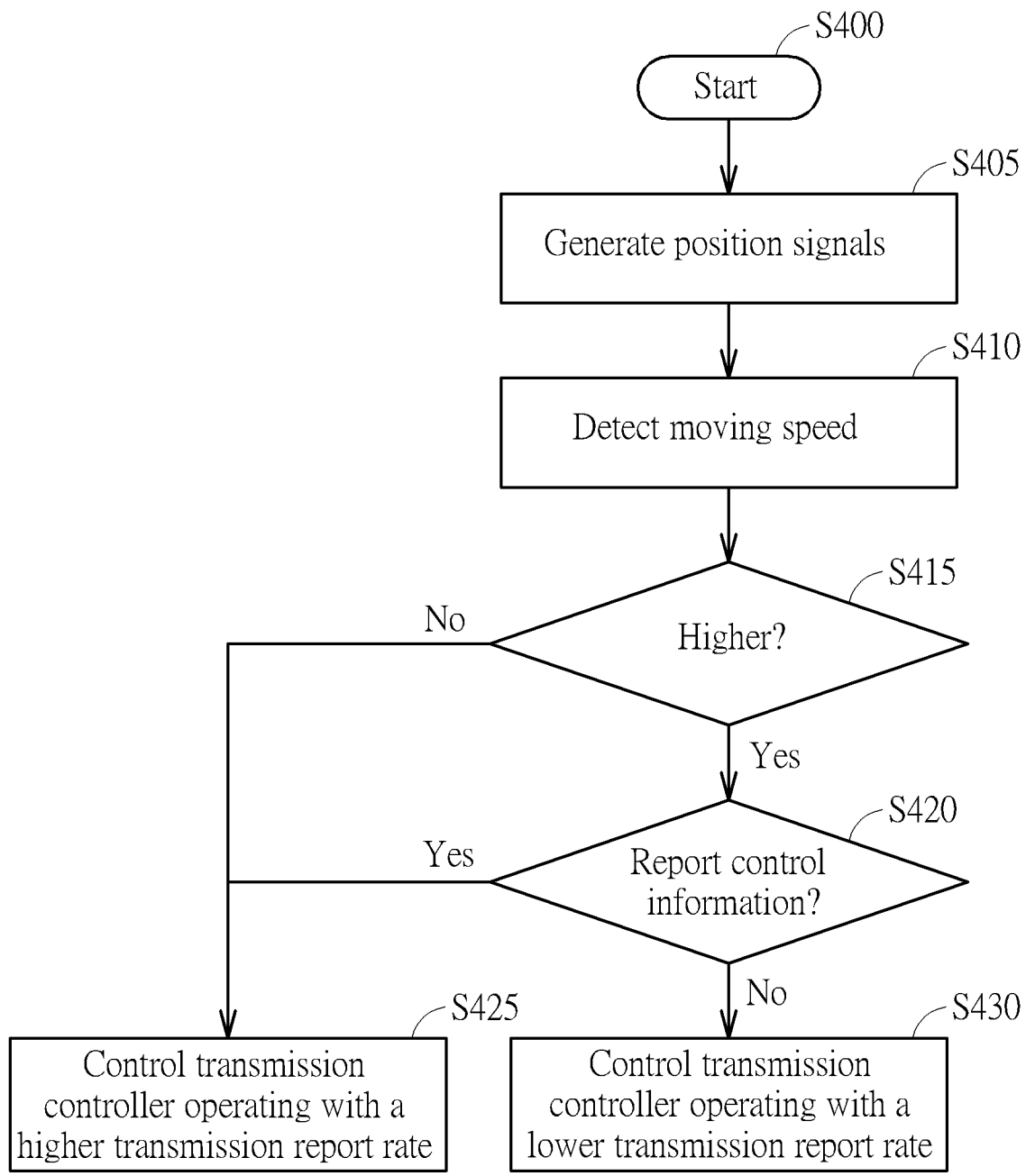
FIG. 4 is a diagram of a flowchart of the optical navigation device being used as an optical mouse device according to an embodiment of the invention.

FIG. 4 is a diagram of a flowchart of the optical navigation device 300 being used as an optical mouse device according to an embodiment of the invention. The steps are descried in the following:

Step S400: Start;

Step S405: Optical sensor 105 senses and generates optical navigation position related signals to the microcontroller 115;

Step S410: Microcontroller 115 detects a moving speed of the optical navigation device 300 based on the optical navigation position related signals;

Step S415: Microcontroller 115 compares the detected moving speed with a specific threshold to determine whether the detected moving speed is higher than the specific threshold; if the moving speed is higher than the specific threshold, then the flow proceeds to Step S420, otherwise, the flow proceeds to Step S425;

Step S420: Microcontroller 115 determines whether to report control information of the clickable button 301 and/or the controllable wheel unit 302 into the computer device 101; if the control information is needed to be reported, then the flow proceeds to Step S425, otherwise, the flow proceeds to Step S430;

Step S425: Microcontroller 115 controls the transmission controller 110 operating with a top transmission report rate such as four-thousand position related signals per second so as to report more position related signals into the computer device 101; and Step S430: Microcontroller 115 controls the transmission controller 110 operating with a basic transmission report rate such as one-thousand position related signals per second so as to report fewer position related signals into the computer device 101 and to save more power.

Figure 5:
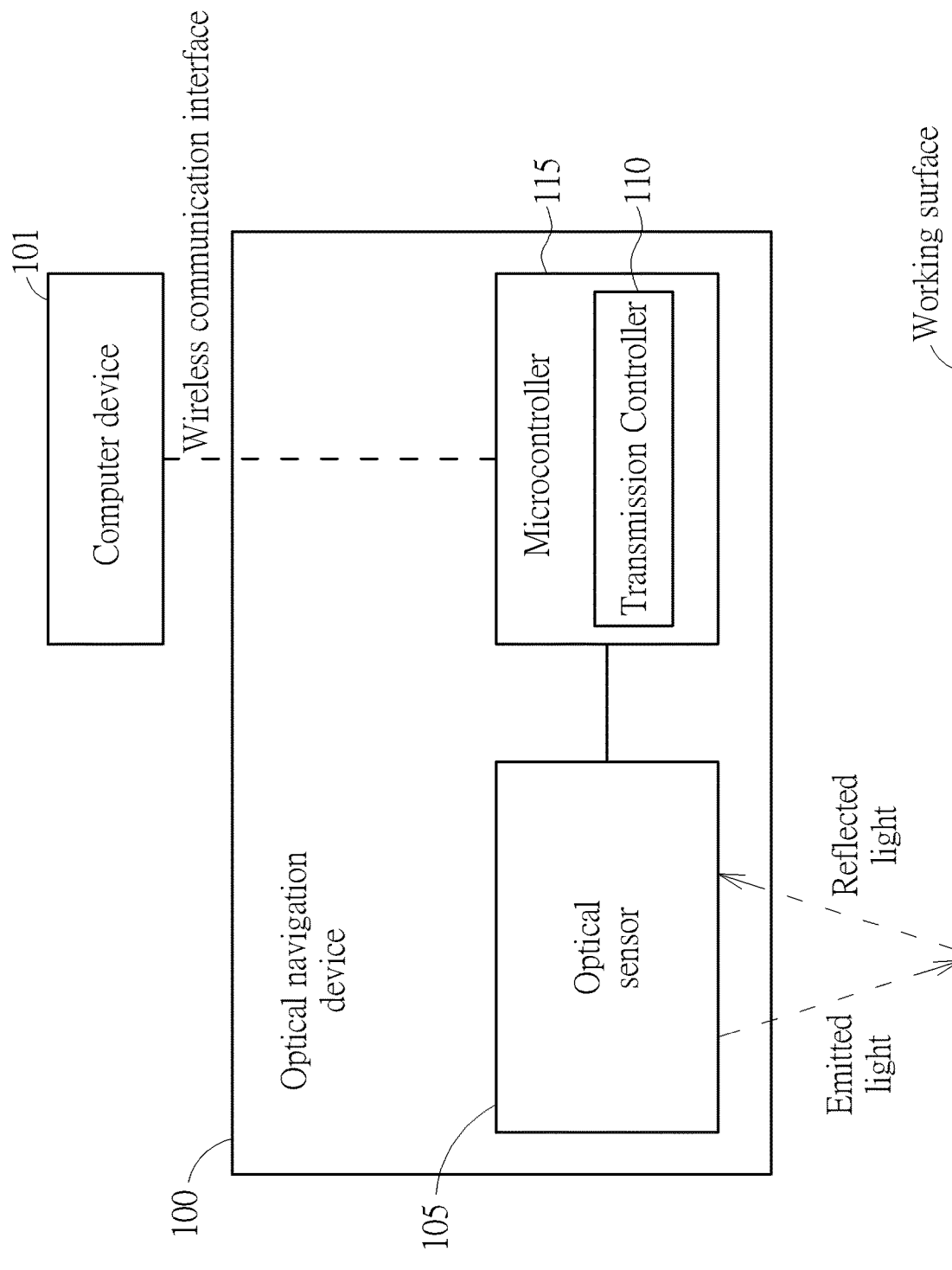
FIG. 5 is a block diagram of an optical navigation device according to another embodiment of the invention.

Further, in one embodiment, the transmission controller 110 may be integrated within the microcontroller 115 to form a processing circuit of the optical navigation device 100. In this example, the microcontroller 115, used as a processing circuit, can wirelessly transmit and report position related signal into the computer device 101 based on a specific wireless communication interface/standard. FIG. 5 shows the example of the transmission controller 110 being integrated within the microcontroller 115, and the description is not detailed for brevity.

Further, in one embodiment, the optical sensor 105 is used to detect the movement of the optical navigation device 100 compared to a working surface of a specific object, and the specific object may be a flat object, a user finger, a crown object of a wristwatch, a track, a cylinder object, or a rotatable object.

Equivalently, in one embodiment, the power consumption of the transmission controller 110 is at a low level in response to the first event corresponding to a higher moving speed and is at a high level in response to the second event corresponding to a lower moving speed. A power consumption of the optical sensor 105 can be substantially identical for the first event and the second event.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device to be coupled to a computer device through a specific communication interface, comprising:
    an optical sensor, configured to sense and generate an optical navigation position related signal in response to a movement of the optical navigation device;
    a transmission controller being configured to wirelessly couple to the computer device; and
    a microcontroller, coupled between the optical sensor and the transmission controller, configured to detect a moving speed of the movement of the optical navigation device and to control the transmission controller dynamically adjusting a transmission report rate of the transmission controller, which is used to periodically transmit the optical navigation position related signal to the computer device through the transmission controller with the transmission report rate, based on the detect moving speed;
    wherein the transmission report rate for the optical navigation position related signal is decreased by the transmission controller in response to a first event that the detected moving speed is increased, and the transmission report rate for the optical navigation position related signal is increased by the transmission controller in response to a second event that the detected moving speed is decreased.

2. The optical navigation device of claim 1, wherein the optical navigation device is an optical mouse device which further comprises at least one controllable user input unit; the microcontroller controls the transmission controller using a specific report rate, which is higher than the transmission report rate for the optical navigation position related signal, to transmit user control input information of the at least one controllable user input unit to the computer device.

3. The optical navigation device of claim 2, wherein the at least one controllable user input unit is a clickable button unit or a controllable wheel unit.

4. The optical navigation device of claim 1, wherein a power consumption of the transmission controller is at a low level in response to the first event and is at a high level in response to the second event; and, a power consumption of the optical sensor is identical for the first event and the second event.

5. The optical navigation device of claim 1, wherein the optical sensor is used to detect the movement of the optical navigation device compared to a working surface of a specific object, and the specific object is a flat object, a user finger, a crown object of a wristwatch, a track, a cylinder object, or a rotatable object.

6. An optical navigation device to be coupled to a computer device through a specific communication interface, comprising:
    an optical sensor, configured to sense and generate an optical navigation position related signal in response to a movement of the optical navigation device;
    a microcontroller, coupled to the optical sensor, configured to detect a moving speed of the movement of the optical navigation device and to dynamically adjust a transmission report rate, which is used to periodically and wirelessly transmit the optical navigation position related signal to the computer device with the transmission report rate, based on the detect moving speed;
    wherein the transmission report rate for the optical navigation position related signal is decreased by the microcontroller in response to a first event that the detected moving speed is increased, and the transmission report rate for the optical navigation position related signal is increased by the microcontroller in response to a second event that the detected moving speed is decreased.

7. The optical navigation device of claim 6, wherein the optical navigation device is an optical mouse device which further comprises at least one controllable user input unit; the microcontroller using a specific report rate, which is higher than the transmission report rate for the optical navigation position related signal, to transmit user control input information of the at least one controllable user input unit to the computer device.

8. The optical navigation device of claim 7, wherein the at least one controllable user input unit is a clickable button unit or a controllable wheel unit.

9. The optical navigation device of claim 6, wherein a power consumption of the microcontroller is at a low level in response to the first event and is at a high level in response to the second event; and, a power consumption of the optical sensor is identical for the first event and the second event.

10. The optical navigation device of claim 6, wherein the optical sensor is used to detect the movement of the optical navigation device compared to a working surface of a specific object, and the specific object is a flat object, a user finger, a crown object of a wristwatch, a track, a cylinder object, or a rotatable object.

11. A method of an optical navigation device to be coupled to a computer device through a specific communication interface, comprising:
   providing an optical sensor to sense and generate an optical navigation position related signal in response to a movement of the optical navigation device;
   detecting a moving speed of the movement of the optical navigation device; and
   dynamically adjusting a transmission report rate of the optical navigation device, which is used to periodically transmit the optical navigation position related signal to the computer device, based on the detect moving speed;
   wherein the transmission report rate for the optical navigation position related signal is decreased in response to a first event that the detected moving speed is increased, and the transmission report rate for the optical navigation position related signal is increased in response to a second event that the detected moving speed is decreased.

12. The method of claim 11, wherein the optical navigation device is an optical mouse device which further comprises at least one controllable user input unit, and the method further comprises:
   using a specific report rate, which is higher than the transmission report rate for the optical navigation position related signal, to transmit user control input information of the at least one controllable user input unit to the computer device.

13. The method of claim 12, wherein the at least one controllable user input unit is a clickable button unit or a controllable wheel unit.

14. The method of claim 9, wherein a power consumption of a processing circuit of the optical navigation device is at a low level in response to the first event and is at a high level in response to the second event; and, a power consumption of the optical sensor is identical for the first event and the second event.

15. The method of claim 11, wherein the optical sensor is used to detect the movement of the optical navigation device compared to a working surface of a specific object, and the specific object is a flat object, a user finger, a crown object of a wristwatch, a track, a cylinder object, or a rotatable object.

* * * * *